United States Patent
Bourne

[19]

[11] Patent Number: 5,944,233
[45] Date of Patent: Aug. 31, 1999

[54] GRANULAR MATERIAL DISPENSING APPARATUS

[76] Inventor: Alan Bourne, Box 1466 Kindersley, Saskatchewan, Canada, S0L 1S0

[21] Appl. No.: 08/857,704

[22] Filed: May 16, 1997

[51] Int. Cl.$^6$ .................................................. G01F 13/00
[52] U.S. Cl. ...................... 222/272; 222/273; 222/274; 222/312; 222/414; 239/668; 239/669
[58] Field of Search .................... 239/668, 669; 222/272, 273, 274, 281, 280, 311, 312, 410, 414

[56] References Cited

U.S. PATENT DOCUMENTS

| Re. 7,926 | 10/1877 | Winchell | 222/312 X |
|---|---|---|---|
| 166,678 | 8/1875 | Aldrich | 222/311 |
| 206,047 | 7/1878 | Shrake | 222/312 |
| 803,082 | 10/1905 | Waterman | 222/414 X |
| 1,859,625 | 5/1932 | Laing | 239/668 |
| 3,175,737 | 3/1965 | Schnell | 222/272 X |
| 3,180,525 | 4/1965 | Fabian et al. | 222/272 X |
| 3,606,965 | 9/1971 | Cortelyou et al. | 222/312 |
| 4,408,704 | 10/1983 | Steilen | 222/312 |
| 4,522,340 | 6/1985 | Gandrud | 222/238 X |
| 4,705,220 | 11/1987 | Gandrud et al. | 239/654 |
| 5,064,099 | 11/1991 | Iwako | 222/312 X |

*Primary Examiner*—Kenneth Bomberg
*Attorney, Agent, or Firm*—Oyen Wiggs Green & Mutala

[57] ABSTRACT

This invention relates to a novel granular material metering and dispensing system. More particularly, this invention pertains to a novel adjustable-rate apparatus for metering and dispensing granular chemicals, seeds and fertilizers. A metering dispenser for granular materials comprising: (a) a metering assembly for affixing to a resevoir of granular materials; and (b) at least one roller comprised of two opposed, truncated cones rotationally mounted on a metering shaft in the metering assembly.

10 Claims, 4 Drawing Sheets

GRANULAR MATERIAL DISPENSING APPARATUS

TECHNICAL FIELD OF THE INVENTION

This invention relates to a novel granular material metering and dispensing system. More particularly, this invention pertains to a novel adjustablerate apparatus for metering and dispensing granular chemicals, seeds and fertilizers.

BACKGROUND

There are a number of metering and dispensing machines on the market for dispensing granular chemicals, seeds and fertilizers in agricultural environments. A problem with many machines is that the metering and dispensing rate for the granulated material cannot be kept constant when the metering apparatus is traversing sloped terrain. In other instances, many metering machines are not capable of maintaining constant dispensation rates per area with changing velocities of the metering and dispensing machine. A problem with other particulate metering and dispensing machines is that the machines cannot accommodate various sizes of particulate material. They either plug up or they cannot maintain consistent dispensing rates.

Many machines currently on the market for metering and dispensing particulate material use fluted rollers, choked augers, or individual fluted rollers, for metering and controlling the dispensing rate of the particulate material. These machines use fixed displacement metering cavities which limit the particle size that can be metered. Larger sizes cannot be handled without damage occurring to the machine. Another problem is that many machines on the market have high power requirements due to fixed displacement designs and thus are expensive to operate.

A number of patents have issued over the years for various designs of feeders and dispensers.

U.S. Pat. No. 206,047, Shrake, shows a feeder with a hopper that has a rotating cylindrical metering device at the bottom. The metered material drops into a second hopper which has a longitudinally scalloped cylinder which dispenses the material in metered amounts. The amount metered is controlled by the position of gate D.

U.S. Pat. No. 7,926, Winchell, illustrates a seeding machine which has a toothed cylinder which is located at the base of a hopper and meters seeds at an adjustable rate. The rate is adjusted by gate e.

U.S. Pat. No. 3,606,965, Cortelyou, discloses a dispenser for use with lawn combines, which dispenses seeds and fertilizers by means of rotating, compartmented, cylindrical drums. The amount of material that is to be dispensed by the device is controlled by the number of compartments on the cylindrical drum that is exposed to the reservoir of materials.

U.S. Pat. No. 4,408,704, Steilen, discloses an adjustable and flexible metering gate for a fluted feed cup assembly on a grain drill. The metering gate is fabricated from a flexible material, and the adjusting lever for the gate is located on the side of the cup opposite the portion of the fluted feed roll. The fluted feed roll is exposed to the grain so that the gate can flex and pass foreign objects without damage and then return to its original position. The feed cup is fabricated from plastic.

U.S. Pat. No. 4,522,340, Gandrud, discloses an applicator for precisely dispensing granular materials, such as herbicides, pesticides and the like. The applicator improves control while compensating for the speed and travel direction of the implement carrying the applicator. The applicator comprises a hopper with an arcuate hopper bottom extension and an internal feed rotor. The arcuate hopper bottom extension is inclined, and the openings in the end include straight lowermost sides oriented parallel to the rotational axis of the feed rotor to obtain better flow control in conjunction with a revolving transfer means located beneath and closely adjacent to the bottom end of the hopper. The revolving transfer assembly includes a plurality of rollers for individually receiving material from the openings in the hopper and distributing it for application. The feed rotor and transfer assembly are vertically and laterally offset and are interconnected for counter rotation in unison responsive to travel of the applicator such that the rate of material application is directly proportional to the speed of travel.

U.S. Pat. No. 4,705,220, Gandrud, et al., discloses an improved, more versatile applicator for precisely dispensing granular chemicals, fertilizers or seed. The applicator includes a hopper with a metering assembly mounted over a material discharge opening in an inclined wall of the closed, convergent bottom end of the hopper. The metering assembly, which is preferably removably secured to the hopper, includes a plurality of individual sets of metering wheels, receivers and gate plates for precise control and more tolerance to tilt. The metering assembly is also adapted to facilitate thorough clean-out of the hopper as well as removal and replacement of the metering wheels without emptying the hopper.

SUMMARY OF THE INVENTION

The invention is directed to a metering dispenser for granular materials comprising: (a) a metering assembly for affixing to a reservoir of granular material; and (b) a granular material moving means located in the metering assembly, said moving means having a biconical shape.

The moving means with the biconical shape can be rotationally mounted on a metering shaft and can have a circular circumferential edge, created by the opposing faces of the biconical shape and the cones can be truncated. The particle moving means can be a series of biconical rollers mounted on the metering shaft.

The pair of opposing conical faces can have a thereon a plurality of radially extending ridges fins. The plurality of fins on one conical face can be offset from the plurality of fins on the opposite conical face of the metering roller. A series of radially extending grooves can be located between the respective series of radially extending fins on each conical face of the metering roller.

The metering assembly can have a bottom which can be of adjustable elevation. The adjustable elevation bottom of the metering assembly can be hinged to the metering assembly and can have a lip over which the granular material can be moved by the moving means.

The reservoir for granular material can have a hopper shape, with an opening in the bottom thereof which can enable granular material to pass into the metering assembly.

A baffle can be mounted below the opening in the base of the hopper, and above the metering assembly.

The material moving means in the metering assembly can comprise a pair of metering shafts rotatably mounted in the metering assembly, the metering shafts being parallel to one another, and each respective shaft can have at least one biconical granular material moving means mounted on respective metering shafts, the biconical material moving means having radially disposed fins and grooves on the conical surfaces thereof for contacting granular material. The pair of metering shafts and biconical material moving means can rotate in opposite directions from one another.

BRIEF DESCRIPTION OF DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

The invention involves a novel adjustable granular material metering dispenser for the application of granular chemicals, seeds and fertilizers in agricultural environments. The apparatus of the invention can be retrofitted to existing seeders or fertilizer dispensers or installed on originally manufactured seeders and fertilizer dispensers.

Figure 1:
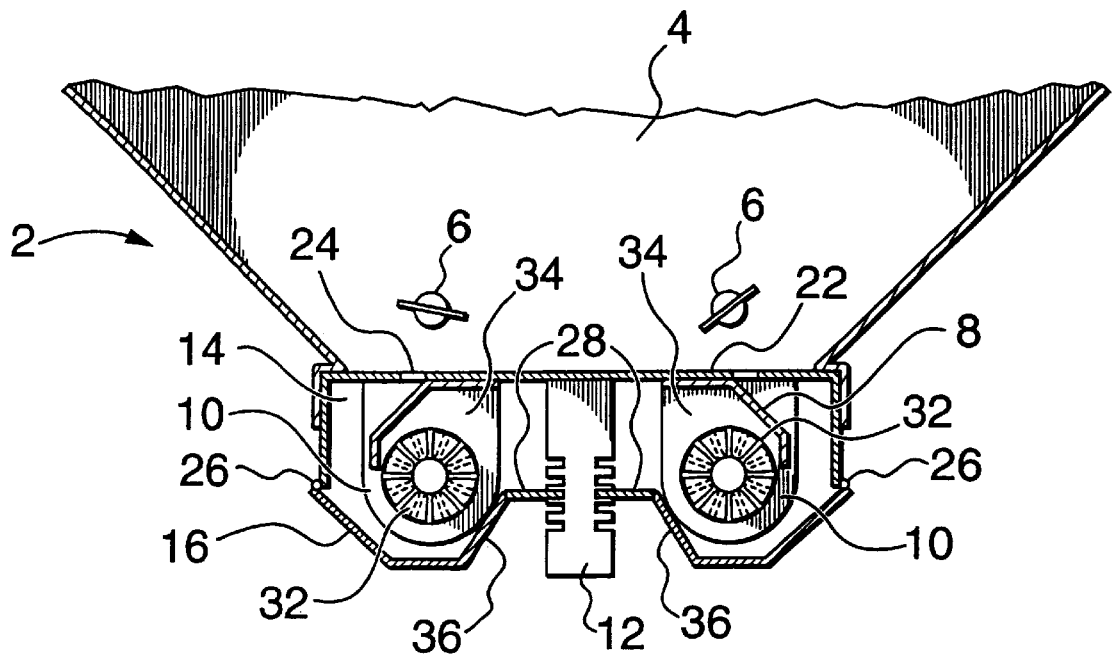
FIG. 1 illustrates an end section view of the adjustable granular material metering dispenser.

FIG. 1 illustrates an end section view of the adjustable granular material metering dispenser. As seen in FIG. 1, the dispenser 2 is constructed of a hopper 4 which houses in bulk the granular material that is to be metered and dispensed. An optional pair of agitators 6 are mounted in he lower region of the hopper 4 and rotate slowly. They keep the particulated, granulated material from settling and clogging in the hopper 4. A hollow roller assembly housing 22 (which is shown in more detail in FIG. 2) is mounted to the underside of the hopper 4. The interior of the roller assembly housing 22 has a pair of roller assembly baffles 8 which symmetrically flare away from one another and are positioned above a pair of roller assemblies 10. The pair of baffles 8 are solid sheets and serve the function of containing and directing the particulate material that drops down from the hopper 4 and avoiding spillage from the meter bottoms 16 when the apparatus is operated on slopes or rough terrain.

The baffles 8 force the particulate material that drops from the hopper 4 to pass around the roller assemblies 10 through channels 14. The base of the roller assembly housing 22 has a symmetrical pair of channel-like meter bottoms 16 which are respectively connected at their exterior sides by hinges 26 to respective bases of the sides of the roller assembly housing 22. By being hinged, the pair of hinged meter bottoms 16 can be adjusted in elevation. The position of elevation of the pair of bottoms 16 is determined by a pair of engagement flanges 28, which engage with selected notches in a double notched vertical position indicator 12. As shown in FIG. 1, the elevation of the pair of meter bottoms 16 is at a mid-point on the vertical range of notches in the position indicator 12.

Figure 1A:
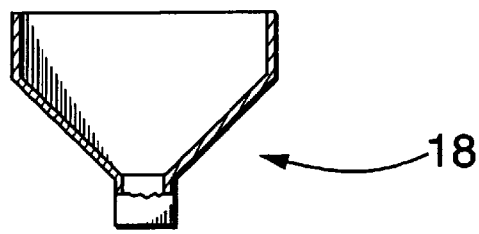
FIG. 1a illustrates a gravity type collector.
Figure 1B:
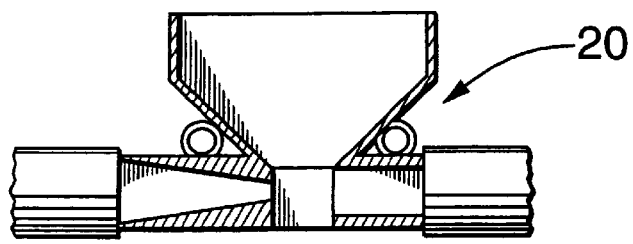
FIG. 1b illustrates a pneumatic type collector.

FIG. 1a illustrates a convention gravity type collector 18, which can be positioned under the base of the roller assembly housing 22 to collect the particulate material that has been dispensed by the dispenser 2. FIG. 1b illustrates a conventional pneumatic type collector 20 which collects and conveys the dispensed particulate material pneumatically by a pneumatic venturi nozzle.

Figure 2:
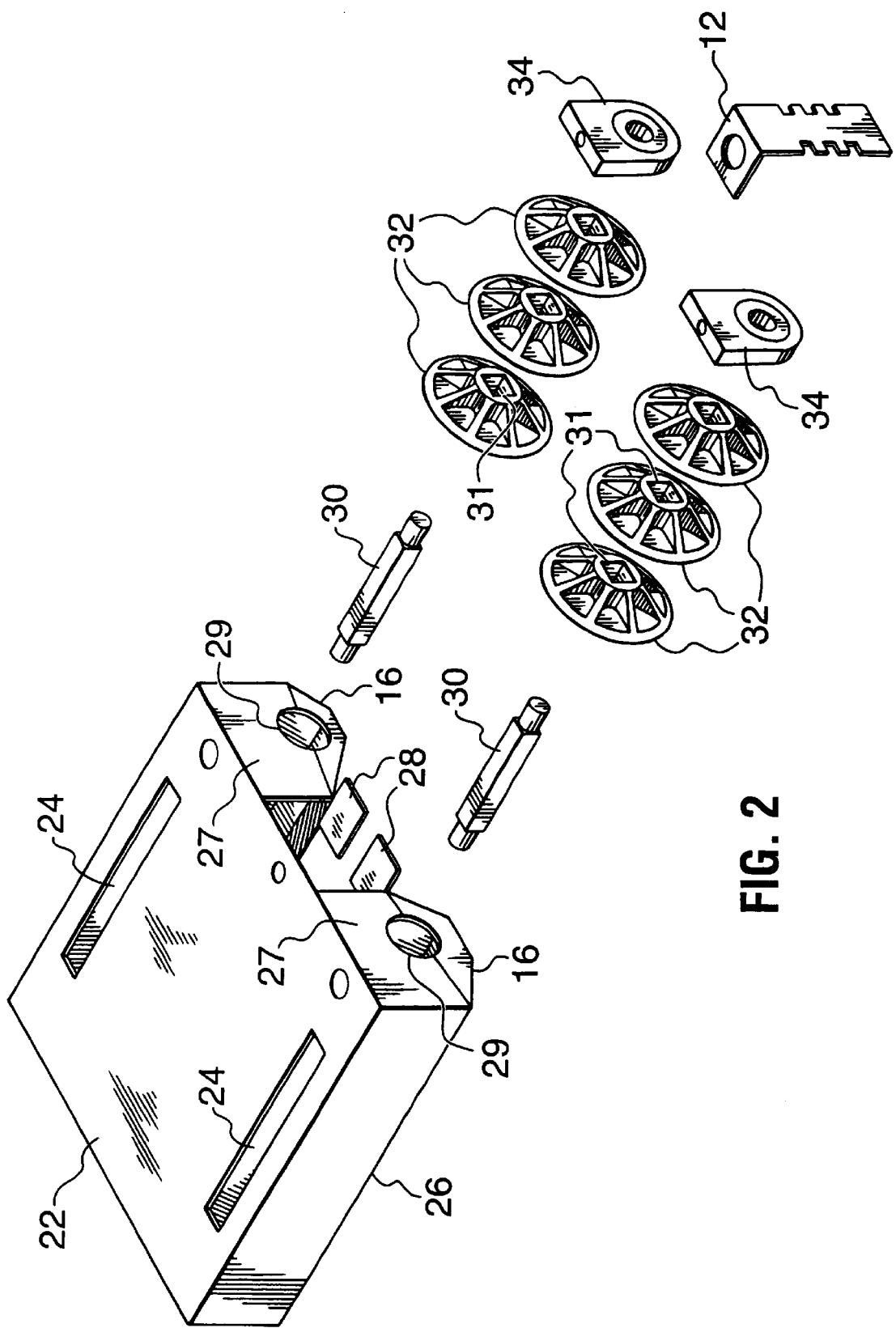
FIG. 2 illustrates an exploded view of the adjustable granular material metering dispenser.

FIG. 2 illustrates an exploded view of the adjustable granular material metering dispenser. As seen in FIG. 2 (taken in association with FIGS. 1 and 3), the roller assembly housing 22 has a hollow box-like configuration. A pair of elongated parallel hopper ports 24 are cut in the top face of the roller assembly housing 22, and align with the respective pair of roller assemblies 10. The ports 24 permit particulate material to pass from the hopper (not shown in FIG. 2) downwardly through baffle channels 14 (not visible) into the respective pair of roller assemblies 10, and the cavity formed by the respective channels of the pair of hinged meter bottoms 16. The pair of meter bottoms 16 are pivotally attached respectively to the parallel base sides of the roller assembly housing 22 by a respective pair of hinges 26 (one of which is illustrated in FIG. 2). Extending downwardly from the front and rear ends of the roller assembly housing 22 are front and rear pairs of plates 27 (the front plates are shown in FIG. 2), with openings 29 therein. The openings 29 enable the ends of the pair of roller mounting shafts 30 to protrude therethrough.

FIG. 2 also illustrates the pair of engagement flanges 28, which cooperate with the vertical position indicator 12 (shown at the lower right in FIG. 2), for the purpose of adjusting the elevation of the pair of hinged meter bottoms 16.

The pair of roller mounting shafts 30 are of an elongated construction, and have a square cross-section. Two parallel series of biconical metering rollers 32 (three are shown for each roller) are respectively mounted on the pair of roller mounting shafts 30. The openings 31 in each metering roller 32 are of congruent square-shaped dimension so that they each fit snugly on the respective square cross-section roller mounting shafts 30. This prevents them from spinning or rotating on the respective roller mounting shafts 30.

A pair of shaft bearing mounts 34 fit at the respective ends of the pair of roller mounting shafts 30 and are adjacent to the end plates 27 at the ends of the roller assembly housing 22. A similar pair of shaft bearing mounts fit adjacent the rear end plates (not shown). These mounts 34 enable the roller shafts 30 to rotate freely.

Figure 3:
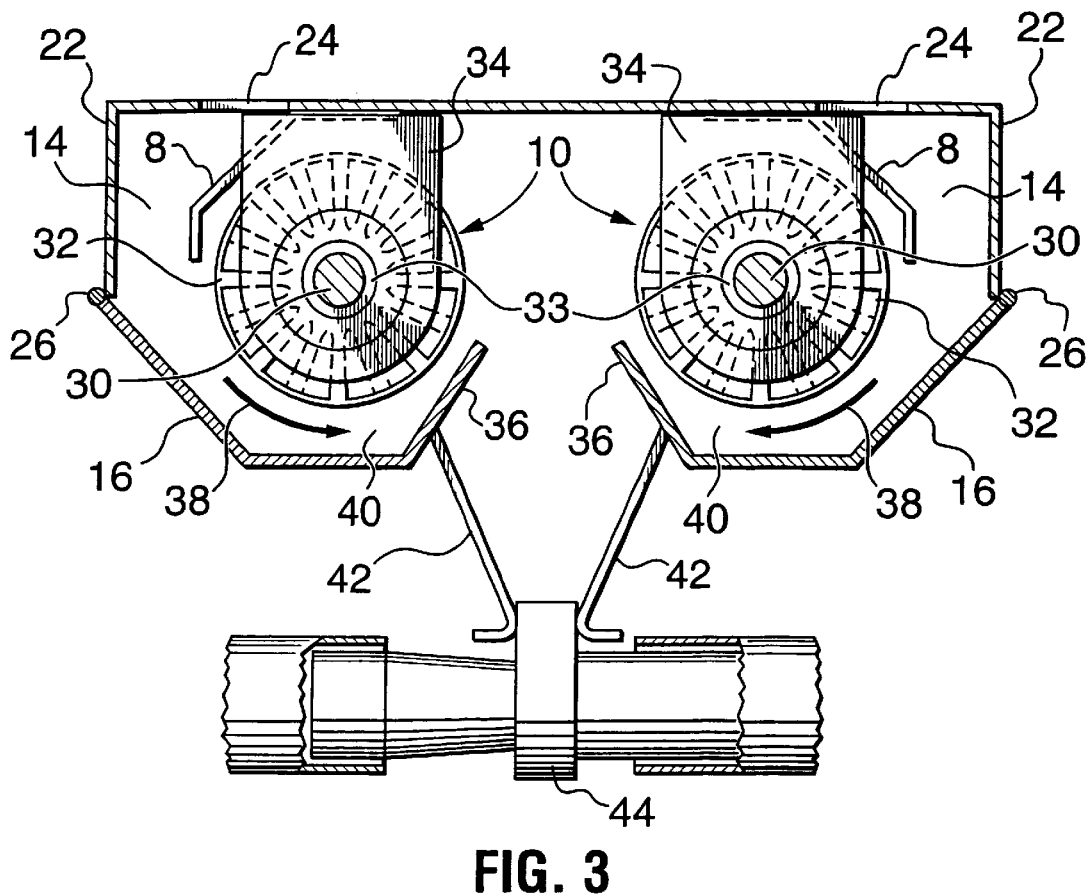
FIG. 3 illustrates an enlarged detail end section view of the metering chambers and roller assembly of the adjustable granular material metering dispenser.

FIG. 3 illustrates an enlarged detail section view of the metering chambers and roller assembly of the adjustable granular material metering dispenser. As seen in detail in FIG. 3, the pair of hopper ports 24 are formed in the top surfaceof the roller assembly housing 22. The pair of roller assembly baffles 8, which are positioned above the respective pair of roller assemblies 10, force the particulate material that drops through the respective ports 24 to pass downwardly through respective baffle channels 14 and around the outer sides of the pair of roller assemblies 10. The two streams of particulate material then drop into the respective metering chambers 40 which are formed by the pair of channel-shaped meter bottoms 16 below the pair of rollers 32. The pair of rollers 32 rotate in opposite directions and towards one another at the base as indicated by the pair of directional arrows 38. The particulate material that has dropped downwardly through the respective pair of ports 24, and has been deflected through respective channels 14 by the pair of roller assembly baffles 8, travels in the same direction as the direction of rotation of the pair of rollers 32 as indicated by the directional arrows 38. FIG. 3 illustrates the pair of metering rollers 32 mounted on the respective pair of roller mounting shafts 30. As seen in FIG. 3, the circular bearing ends of the pair of roller mounting shafts 30 fit in bearings 33, which are respectively mounted in the pair of shaft bearing mounts 34.

The pair of channel-like meter bottoms 16, which are hingedly mounted to the housing 22 by the pair of hinges 26, can be adjusted in elevation as indicated previously. The inner facing walls of the pair of meter bottoms 16 are formed in the shape of discharge lips 36. Thus, when the pair of metering rollers 32 rotate in the direction of the pair of directional arrows 38, they cause the particulate material held in the respective metering chambers 40 to spill over the top edges of the respective pair of discharge lips 36. From there, the particulate material spills downwardly in two streams into a receiving chute 42. The particulate material that drops into the receiving chute 42 is then conveyed away by a conventional venturi-type pneumatic conveyor 44.

Figures 4, 5:
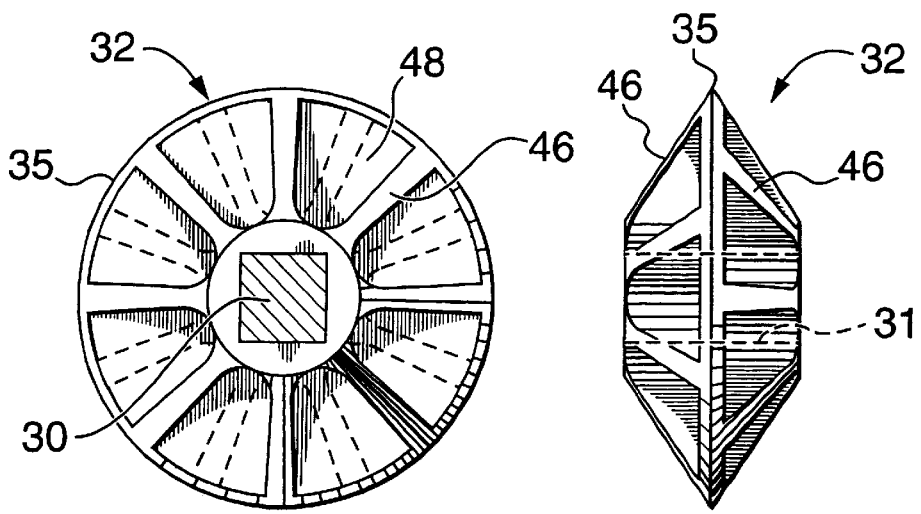
FIG. 4 illustrates a front view of a biconical metering roller.
FIG. 5 illustrates a side view of a biconical metering roller.

FIG. 4 illustrates a front view of the biconical metering roller. The metering roller 32 is of a circular-truncated biconical configuration, with a square opening in the centre thereof so that the metering roller 32 can be mounted on the square cross-section roller mounting shaft 30. FIG. 4 also illustrates how the conical surface of the metering roller 32 has formed therein a series of radially extending raised fins 46. These raised series of fins 46 form a series of adjacent radially extending valleys or grooves 48 around the faces of the two conical surfaces.

The opposing truncated-conical surfaces of each metering roller 32 gives a biconical double tapered shape to the roller 32 when viewed from the side, (as seen in FIG. 5). The circumferential edge 35 of the roller 32 is circular and smooth. The radially extending series of fins 46 therefore extend linearly from the truncated centre 31 of the roller 32 to the smooth circular circumferential edge 35. As seen in FIG. 4, the fins 46, shown in alternating solid and dotted lines, are staggered on the opposite conical faces of the roller 32. This ensures an even rate of metering at slower revolutions. The hub of the roller 32, as explained previously, has a square configuration and provides positive drive when the roller 32 is mounted on the square cross-section roller mounting shaft 30.

FIG. 5 illustrates a side view of the biconical a metering roller 32. As seen in FIG. 5, the pair of opposing truncated-conical faces of roller 32 have thereon tapered ribs 46 which extend from the central square opening 31 towards the circular smooth outer edge 35.

Figure 6:
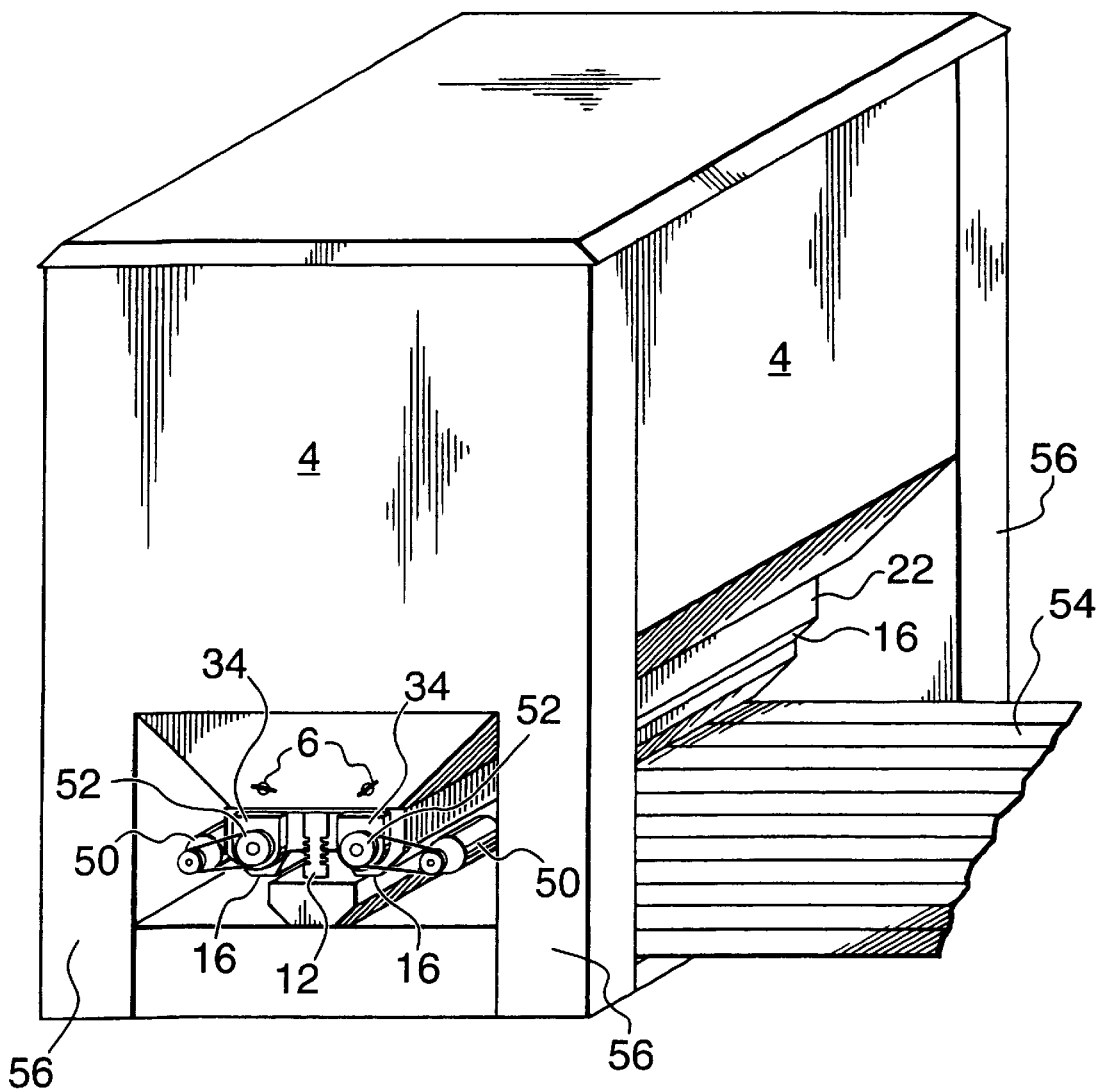
FIG. 6 illustrates an isometric view of the adjustable granular material metering dispenser installed in a supported hopper chamber

FIG. 6 illustrates an isometric view of the adjustable granular material metering dispenser installed in a supported hopper chamber. As seen in FIG. 6, pulley wheels 52 are affixed to the respective ends of the roller mounting shafts 30 (not shown) held in the respective pair of shaft bearing mounts 34, and are driven by a respective pair of drive motors 50. The vertical position indicator 12, and the pair of meter bottoms 16 are also visible in FIG. 6. As seen in FIG. 6, the hopper 4 is mounted on four legs 56. Particulate material that has been dispensed by the dispenser, as the hopper 4 is moved along, is indicated by the series of parallel lines 54.

Operation

The hopper 4 is filled with the particulate material to be metered. The particulate material flows by gravity through the pair of slotted holes 24 and fills the respective cavities 40 in the metering assembly.

The particulate material flows around the biconical tapered rollers 32 to a depth which is determined by the height adjustment on the vertical position indicator 12. As the two metering shaft assemblies 10 rotate, the particulate material is propelled by the rollers 32 to spill over the respective edges of the lips 36 of the two meter bottoms 16. The particulate material then falls into a hose or a pneumatic ejector. The two shaft and roller assemblies 10 are rotated either at a predetermined rate or at a ground speed compensated rate. The shafts 30 can be driven by a number of different methods (for example, electric or hydraulic motor, or by chains or belts) as is common for agricultural equipment. Since the metering device 2 has two metering shafts 30 which are driven in opposite directions, the counter-rotation movement provides a constant rate of application when the machine is operated on a slope or angle. In other words, one meter bottom 16 compensates for the other in off-horizontal positions.

The tapered biconical design of the metering rollers 32, with the offset radial fins 46 and corresponding adjacent grooves 48, that are distributed around the faces of the two opposing conical surfaces provides in effect a dynamic variable volume cavity in each roller 32 which can accommodate a very wide spectrum of particle sizes. Thus the biconical rollers 32 promote particle flow and discourage clogging. The tapered biconical shape of the roller with offset fins 46 and grooves 48 also tends to present a flared aspect to the particles to promote particle flow regardless of particle depth in the chambers 40. Actual particle flow rates can be regulated by controlling the rotation rate of the two shaft and roller assemblies 10 and the depth of particles in the chambers 40 by position of the two meter bottoms 16.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A metering dispenser for granular materials comprising:
   (a) a metering assembly for affixing to a reservoir of granular material; and
   (b) a roller having a planar circular circumferential edge and comprised of two opposed, truncated cones, the roller being mounted on a rotational metering shaft in the metering assembly, wherein an outer face of each cone has thereon a plurality of ridge fins extending radially from a hub of the roller to the circular circumferential edge of said roller, a plane of said fins passing through an axis of the hub, said plurality of ridge fins defining therebetween a plurality of radially extending grooves.

2. A dispenser as claimed in claim 1 wherein a plurality of rollers are mounted on the metering shaft.

3. A dispenser as claimed in claim 2 wherein the plurality of fins on one conical face are offset from the plurality of fins on the opposite conical face of the metering roller.

4. A dispenser as claimed in claim 2 in combination with said reservoir, wherein the reservoir has a hopper shape, with an opening in a bottom thereof which enables granular material to pass into the metering assembly.

5. A dispenser as claimed in claim 4 wherein a baffle is mounted below the opening in the bottom of the reservoir, and above the metering assembly.

6. A dispenser as claimed in claim 2, wherein a second parallel metering shaft is rotatably mounted in the metering assembly and has at least one corresponding roller mounted thereon.

7. A dispenser as claimed in claim 6 wherein the pair of metering shafts and associated rollers rotate in opposite directions from one another.

8. A dispenser as claimed in claim 7 wherein the metering assembly has a bottom which is hingedly attached to said metering assembly and which is of adjustable elevation, said bottom further comprising a pair of lips defining an opening between and below the pair of shafts into which the granular material is moved by the rollers.

9. A dispenser as claimed in claim 2 wherein the metering assembly has a bottom which is hingedly attached to said metering assembly and which is of adjustable elevation.

10. A dispenser as claimed in claim 9 wherein the adjustable elevation bottom has a lip over which the granular material is moved by the roller.

* * * * *